Sept. 15, 1959  F. COVA ET AL  2,904,323
COOLING DEVICES FOR THE CEMENT CLINKERS
Filed April 5, 1957  2 Sheets-Sheet 1

INVENTORS,
FEDELE COVA,
SERGIO DE AMICIS,
CESARE CESARENI
BY
Wenderoth, Lind & Ponack
Attys Sept. 15, 1959   F. COVA ET AL   2,904,323
COOLING DEVICES FOR THE CEMENT CLINKERS
Filed April 5, 1957   2 Sheets-Sheet 2
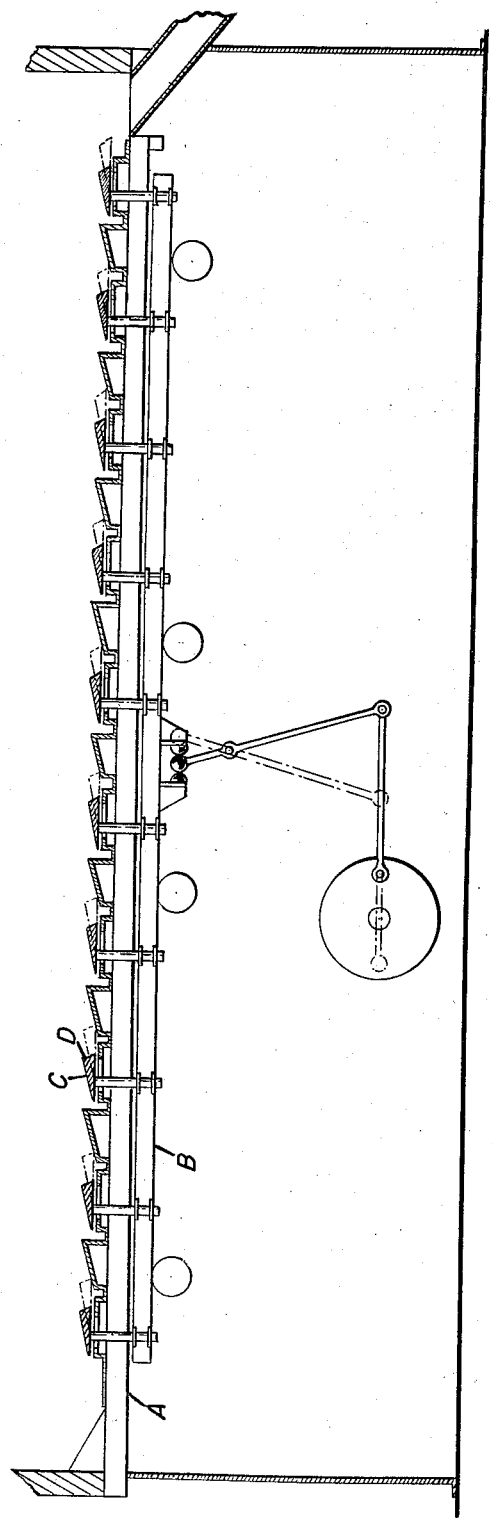
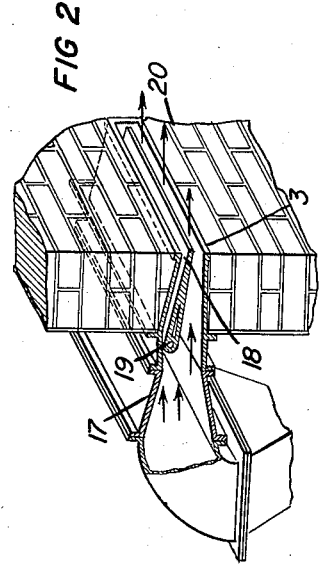
INVENTORS,
FEDELE COVA,
SERGIO DE AMICIS,
CESARE CESARENI
BY *Wenderoth, Lind and Ponack*
ATTORNEYS

United States Patent Office 2,904,323
Patented Sept. 15, 1959

2,904,323
COOLING DEVICES FOR THE CEMENT CLINKERS

Fedele Cova, Sergio De Amicis, and Cesare Cesareni, Rome, Italy, assignors to Cementir Cementerie Del Tirreno S.p.A., Rome, Italy, a company of Italy Application April 5, 1957, Serial No. 650,943

Claims priority, application Italy April 20, 1956

2 Claims. (Cl. 263—32)

It is known that the cooling grates for the cement clinkers operate by means of a cold air insufflation through a layer of clinker arranged on a movable grate plane.

It is also known that when, due to particular chemical or physico-chemical features of the raw material, or due to a particular operation of the kiln, a clinker is produced which is not perfectly agglomerated to grains having a certain size, the good operation of the cooling grate is adversely affected by the following co-acting causes:

Diminution of the permeability of the layer arranged on the grate and consequent abnormal over-heating of the mechanical components of the grate.

Rapid wear of the plates in the grates where the clinker feeding movement is obtained by a sliding movement of movable plates on stationary plates, said wear being due to penetration of the powder fraction of the clinker between the movable and the stationary parts, the operation of the unit being also rendered more severe by the lesser cooling due to the lesser passage of air consequent to the reduced permeability of the clinker layer.

Difficult operation of the kiln in that when the powder conditions of the clinker change, also the permeability of the layer arranged on the grate changes, and with it the air amount fed over the grate.

The clinker cooling occurs irregularly and particularly in response to a greater or lesser permeability of the layer arranged on the grate, at parity of kiln output.

The object of the present invention is the separation and the removal of the powder fraction of the clinker at its outlet from the kiln before said powder fraction comes into contact with the grate plane.

The above separation of the powder fraction from the clinker grains may be obtained by means of a strong air stream blown by a blower through an aperture arranged over the head of the grate, under the outlet from the kiln. Said aperture is so arranged that the air stream issuing therefrom passes through the flow of incandescent clinker falling from the furnace, carrying out the particles having a lesser mass, i.e. the smaller particles.

By adjusting the blower rate and the size of the aforesaid aperture it is possible to adjust the unit so as to remove only those particles having a diameter smaller than that which can be considered prejudicial to a good operation of the grate, so that only the greater diametered grains reach the grate, i.e. those forming thereon a surely permeable layer.

As the air blown through the aperture is cold air, a rapid cooling is obtained for the smaller particles which are removed by the air stream.

The smaller clinker particles carried by the air stream are recovered in a separator device and conveyed to the outlet from the grate, where said particles are mixed to the cold granular clinker which leaves the grate.

The device may be embodied in any suitable way so as to be applied to any type of cooling grate.

This invention will be diagrammatically described by way of example, with reference to the attached drawings, wherein:

Fig. 2 shows a detail perspective view, in an enlarged scale, of the feeding and blowing system for the air to remove the powder fraction of the product.

Fig. 3 is a detail view of the grate plates.

Figure 1:
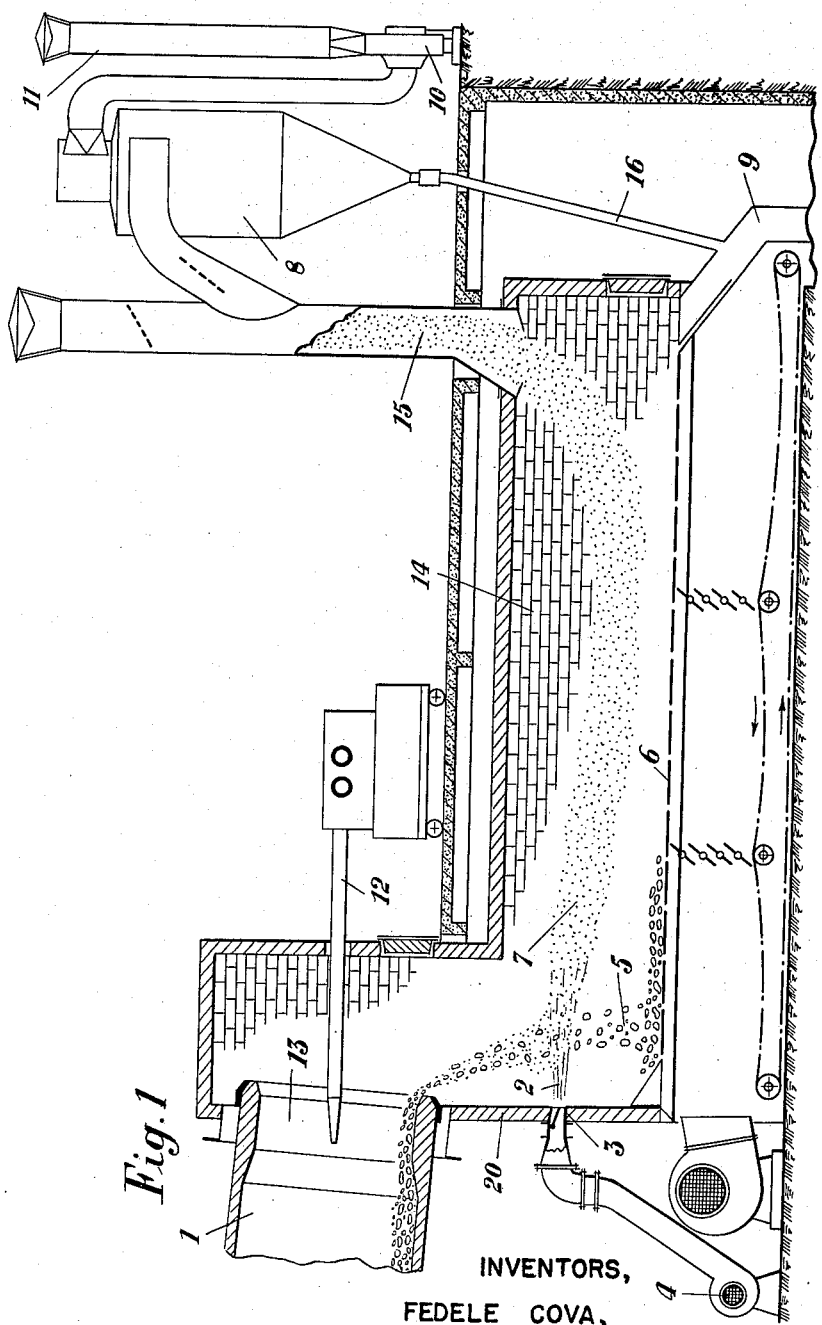
Fig. 1 shows a diagrammatical vertical cross-sectional view of a plant with a removable plates grate, embodying the improvement according to this invention.

It is to be noted that, although Fig. 1 shows, even if in largely diagrammatical form, the whole production plant for the clinker, only the parts concerned with this invention will be hereinafter described.

The device comprises the rotary type kiln 1, fired by the burner 12; said furnace delivers through the outlet 13 the incandescent clinker which falls into the chamber 14, the bottom of which is formed by the movable plates grate 6.

The fall of the clinker passes through the cool air stream 2, issuing from the aperture 3 and which will be described in more detail hereinafter. Said stream passes lengthwise through the chamber 14, over the grate 6, and is supplied by the blower 4.

The larger particles, due to their own weight, pass through said stream 2 and fall then onto the plane of the grate 6, while the less diametered particles, generally shown at 7 in Fig. 1, are conveyed by the stream 2 towards the flue 15 wherefrom said particles enter the cyclone separator 8 where the clinker is separated from the air, the latter being exhausted towards the flue 11, due to the sucking action of the fan 10, while the separated clinker particles fall to the outlet from the grate 9.

With reference to Fig. 2, although for sake of clearness in the drawing the proportions of some parts have been altered, also in this figure, 4 denotes the blower delivering the air to the aperture 3 forming the outlet of a prismatic header 17 extending throughout the length corresponding to the fall of the clinker, so as to have an air stream impinging against the full width of said fall.

An adjusting means for the air delivery is inserted within the aperture 3, and said means consists of a tapered flap 18, the thinner edge of which is substantially flush with the inner wall 20 of the chamber 40, while the thicker edge is pivoted at 19 on the prismatic header 17. Thus, by rotating the flap 18 by means of any known device, not shown in figure, it is possible to adjust the amount of the air issuing from the aperture 3, and therefore to adjust the conveying action on the clinker. The grate schematically illustrated in Fig. 1 of the drawing is shown in Fig. 3 as being formed of a stationary (A) and a movable (B) frame. On the two frames there are mounted alternately rows of stepped plates having on one side an upper plane (C) inclined upwardly at a few degrees relative to the horizontal from the end of the incoming material and having an almost vertical projection (D) on the opposite side. The plates mounted on the movable frame are reciprocated by the frame. When advancing toward the discharging outlet the vertical projection urges the material in the same direction and conveys it on the stationary plates. When the plates return to the starting position, on the contrary, the material slides on the inclined plate without following the motion thereof. In this manner the material is given a pulsating motion toward the outlet.

We claim:

1. A cooling device for cement clinkers supplied by a kiln, which comprises a cooling chamber for the clinker, a rotating kiln associated with the said chamber and opening into said cooling chamber to supply the clinker thereto, said chamber having an inlet at the end thereof which receives the clinker supplied by the said kiln, said chamber having a first outlet in the lower part of the said chamber at the end opposite the said inlet and a second outlet in the upper wall of the chamber at the same end as the said first outlet, a grate located in the lower part of the said chamber for receiving the clinker supplied through the said inlet, said grate being for conveying the clinker which has fallen thereon toward the said first outlet, means associated with and located underneath the said grate for forcing cooling air through the said grate and the clinker which has fallen on the grate, the wall of the said chamber at the end which receives the clinker having an aperture therein intermediate between the said inlet and the said grate, a blower connected to the said aperture outside of the said chamber for supplying cold air to said chamber through the said aperture, said aperture being adjustable in area and being positioned to direct said cold air against the falling clinker supplied by said kiln before said clinker reaches the said grate, whereby the clinker having small dimensions is prevented from reaching said grate and is removed together with the air supplied by the said blower through said chamber along a zone located above the said grate toward the said second outlet, means external of the said chamber and located at the end of the chamber in which the two outlets are located for joining externally of the said chamber the two outlets, whereby the particles of small dimensions of the clinker coming out of the said second outlet are mixed with the clinker of large dimensions coming out of the said first outlet.

2. A cooling device for cement clinkers supplied by a kiln, which comprises a cooling chamber for the clinker, a rotating kiln associated with the said chamber and opening into said cooling chamber to supply the clinker thereto, said chamber having an inlet at the end thereof which receives the clinker supplied by the said kiln, said chamber having a first outlet in the lower part of the said chamber at the end opposite the said inlet and a second outlet in the upper wall of the chamber at the same end as the said first outlet, a grate located in the lower part of the said chamber for receiving the clinker supplied through the said inlet, said grate being for conveying the clinker which has fallen thereon toward the said first outlet, means associated with and located underneath the said grate for forcing cooling air through the said grate and the clinker which has fallen on the grate, the wall of the said chamber at the end which receives the clinker having an aperture therein intermediate between the said inlet and the said grate, said aperture having a length adapted to extend across the width of the mass of the clinker falling from the said rotating kiln on the grate, a blower connected to the said aperture outside of the said chamber for supplying cold air through the said aperture to the said chamber, a header having a trapezoidal section connected on one end to the said blower and extending into the said aperture flush with the inner surface of the said chamber along the whole width of the said aperture, a tapered flap having a length equal to the inner length of the header and being pivoted at its rear edge on the said header at the outer surface of the forewall of the said chamber and having the free end flush with the end of the header at the inner surface of the chamber, said flap being movable to vary the section of the said header opening into the said chamber, said header being positioned to direct said cold air against the clinker falling from said rotating furnace before the clinker reaches the said grate, whereby the particles of the clinker of small dimensions are prevented from reaching the said grate and are removed together with the air stream coming from the said header along a zone located above said grate toward the said second outlet, a cyclone located near and connected to the said second outlet and receiving said air containing the particles of clinker of small dimensions and separating said particles from the said air and for said particles to fall down and join the said clinker with large dimensions coming from the said first outlet.

References Cited in the file of this patent

UNITED STATES PATENTS

| | | |
|---|---|---|
| 127,727 | Yeagly | June 11, 1872 |
| 1,420,593 | Titchmarsh | June 20, 1922 |
| 1,837,836 | Powell | Dec. 22, 1931 |
| 2,346,500 | Moore | Apr. 11, 1944 |
| 2,587,378 | Petersen | Feb. 26, 1952 |
| 2,750,681 | Berry | June 19, 1956 |

FOREIGN PATENTS

| | | |
|---|---|---|
| 296,221 | Great Britain | Aug. 30, 1928 |